June 19, 1934.  W. LUMME  1,963,330
ROTARY METER
Filed May 29, 1930

Inventor:
Willy Lumme

Patented June 19, 1934

1,963,330

UNITED STATES PATENT OFFICE 1,963,330

ROTARY METER

Willy Lumme, Quedlinburg, Germany

Application May 29, 1930, Serial No. 457,478
In Germany October 28, 1929

1 Claim. (Cl. 73—37)

This invention relates to a rotary meter for liquids, in which the passing of the liquid from the blade wheel chamber into the driving gear box of the counting mechanism is prevented in that in the driving gear box an automatic compensating counter pressure to the pressure existing in the blade wheel chamber is produced by connecting up the meter to a carbon dioxide conduit, which prevents the liquid penetrating into the driving gear box, so that a positive connection between the driving shaft of the blade wheel and the driving gear of the counter can be effected, so that an accurate measuring of the liquid passing through the meter is obtained. Further the meter is suitable for use for all passage cross sections of the feed conduit, an adjustable regulating pin being fitted by which the passage channel of the conduit can be so reduced or enlarged that it is accurately adapted to the counter.

An embodiment of the invention is illustrated by way of example in the accompanying drawing in which.

Figure 1:
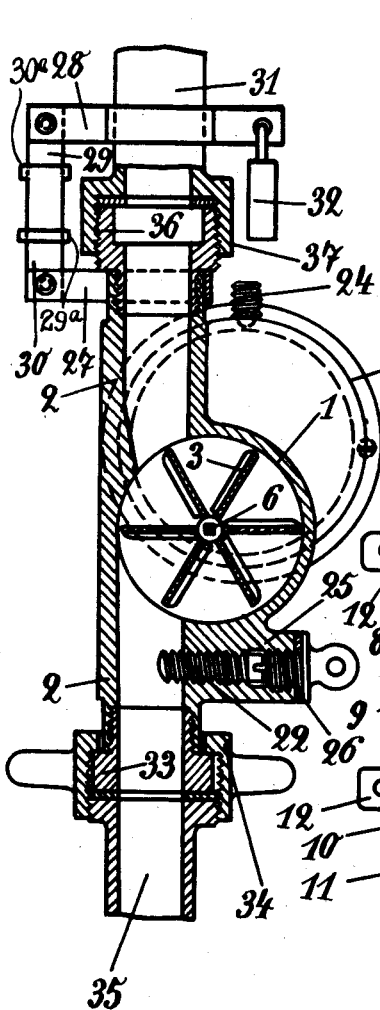
Fig. 1 shows a longitudinal section through the meter.
Figure 2:
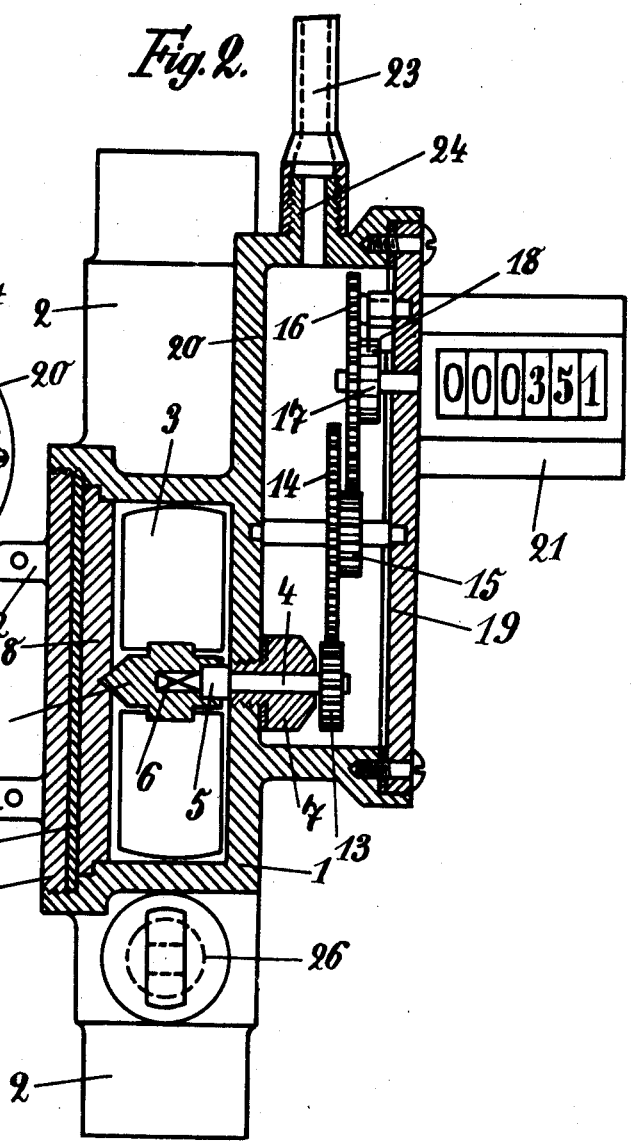
Fig. 2 shows a front elevation of same in section on a larger scale.

The meter consists of a casing 1 having a pipe socket 2 at each end, which sockets are provided with female screw threads. A blade wheel 3 is arranged in the casing 1 and a collar 5 of the shaft 4 of said blade wheel bears against the wall of the casing 1. The front end of the shaft 4 has a square portion 6, on which the blade wheel 3 is removably fitted. The shaft 4 extends through a bush 7 screwed into the wall of the casing 1. The casing 1 is closed by a disc 8 having a recess in which a pin 9 on the hub of the blade wheel 3 engages. In front of the disc 8 a packing disc 10 is situated and in front of said packing disc 10 a closing disc 11, adapted to be screwed into the casing 1 and having two lugs 12 for screwing the disc 11 in and out, is arranged. Holes are provided in the lugs 12 to enable the disc 11 to be sealed in a suitable manner after having been screwed in.

The shaft 4 carries a spur wheel 13 on one end, from which the spur wheels 14, 15 and 16 are driven, the latter being connected with a ratchet wheel 17 on which a pawl 18 bears, which pawl is fastened on the casing cover 19 on the driving gear box 20, on which cover 19 the counting mechanism 21 is also mounted.

On the gear box 20 an externally threaded tubular socket 24 is also provided to enable the casing 20 to be connected with the carbon dioxide conduit by a hose 23, so that a higher pressure is maintained in the gear box 20 than in the blade wheel casing 1. The box 20, instead of being connected with the carbon dioxide conduit may be airtightly closed and exposed to the pressure of compressed air.

A screw pin 22 is adjustably arranged below the blade wheel 3 in the feed pipe socket 2 and serves for narrowing or widening the passage width of the pipe socket 2 so that the passage width can be accurately adjusted to the counting mechanism. After setting the screw pin 22 the extension 25 is tightly closed by a screw bolt 26, which latter is sealed on the casing 1.

The rotary meter is connected up in the liquid conduit and secured in this position by two clips 27 and 28, which are hingedly connected by two bridges 29 and 30, shiftable relatively to one another and guided by straps 29a and 30a mounted one on the end of each of the bridges 29 and 30 and loosely embracing the other bridge, so that the clips 27 and 28 can be brought nearer together or moved apart. The lower clip 27 encircles the upper pipe socket 2 and the upper clip 28 the pipe conduit 31. The ends of the clip 28 are connected by a small lock 32.

A sleeve 33 is screwed into the lower pipe socket 2 and on the flange of this sleeve a cap nut 34 bears, which is screwed onto the feed pipe 35.

A sleeve 36 is screwed into the upper pipe socket 2, which sleeve has a male screw thread, on which the connecting part 37 of the conduit 31 leading to the point for use is screwed.

I claim:

A meter for measuring the flow of liquids, comprising in combination a blade wheel casing having a passage for the flow of liquid, a gear casing made in one piece with said blade wheel casing and having a bore establishing communication with said blade wheel casing, a liquid operated blade wheel in said blade wheel casing, a train of gears in said gear casing, a bush in the communicating bore between said casings, a hub carrying said blade wheel having a pointed end and a square bore, a disc in said blade wheel casing having a recess engaging the point of said hub, a cover screwed into said blade wheel casing over said disc adapted to press said disc against the pointed end of said hub, a shaft carrying one of said gears journalled in said bush and having a square end engaging in the bore of said hub and adapted to cooperate with the point of said hub engaging in said disc to maintain said blade wheel concentric in said blade wheel casing, a collar on said shaft bearing against said bush adapted to maintain said shaft in position, a cover detachably mounted on said gear casing, a counting mechanism on said gear casing cover adapted to be driven by said blade wheel through the intermediary of said train of gears to register the quantity of liquid flowing through said blade wheel casing, and a carbon dioxide supply socket on said gear casing, adapted to supply carbon dioxide into said gear casing to maintain therein a greater pressure than in said blade wheel casing.

WILLY LUMME.